United States Patent [19]

Brickey

[11] 3,938,157

[45] Feb. 10, 1976

[54] ROTATABLE RADAR ANTENNA FEED AND RECEIVER HORN

[75] Inventor: Orville G. Brickey, Indianapolis, Ind.

[73] Assignee: The United States of America as represented by the Secretary of the Navy, Washington, D.C.

[22] Filed: Aug. 14, 1969

[21] Appl. No.: 851,158

[52] U.S. Cl. ................ 343/756; 343/763; 343/786; 343/100 PE; 343/16 M; 333/11

[51] Int. Cl.[2].... H01Q 3/12; G01S 9/22; H01P 5/16

[58] Field of Search...... 343/16 M, 100.3, 756, 763, 343/786; 333/11, 21

[56] References Cited

UNITED STATES PATENTS

| | | | |
|---|---|---|---|
| 2,845,622 | 7/1958 | Gamble | 343/16 M |
| 3,215,957 | 11/1965 | Dantzig et al. | 343/100.3 |
| 3,268,894 | 8/1966 | Lewis et al. | 343/756 X |
| 3,287,729 | 11/1966 | Mark et al. | 343/756 |
| 3,453,617 | 7/1969 | Begeman et al. | 343/16 M X |

*Primary Examiner*—Malcolm F. Hubler
*Attorney, Agent, or Firm*—R. S. Sciascia; Paul S. Collignon

[57] ABSTRACT

A rotatable radar antenna feed and receiver horn having two summing ports and a difference port with a rotatable section having a plurality of susceptor pins to rotate the polarization of the transmitted and received electromagnetic energy to reduce or minimize clutter and to enhance a target.

2 Claims, 2 Drawing Figures

INVENTOR
ORVILLE G. BRICKEY

BY H. H. Losche
Paul S. Collignon
ATTORNEYS

ROTATABLE RADAR ANTENNA FEED AND RECEIVER HORN

STATEMENT OF GOVERNMENT INTEREST

The invention described herein may be manufactured and used by or for the Government of the United States of America for governmental purposes without the payment of any royalities thereon or therefor.

CROSS-REFERENCES TO RELATED APPLICATIONS

Patent application of Begeman et al. entitled "Switchable Linear-Circular Polarized Monopulse Radar Feed Producing Two Axis (Three-Dimensional Tracking) Information Utilizing A Two-Lobe Monopulse Design", Ser. No. 384,029, filed July 14, 1964, now U.S. Pat. No. 3,453,617.

Patent application of Orville G. Brickey entitled "3-Channel Selectable Polarization, Target Discrimination Antenna," Ser. No. 515,740, filed Dec. 22, 1965.

BACKGROUND OF THE INVENTION

The present invention relates to an antenna feed device which provides two-axis tracking by use of first and second sum waveguide channels and one difference channel. A polarizing section is rotatably mounted to rotate the polarization of a wave by a factor of two, that is, the polarization of a wave will be rotated 90° when the polarizing section is rotated 45° and, likewise, the polarization of a wave will be rotated 180° when the polarizing section is rotated 90°.

The resolution of early tracking radars was improved by raising the transmitter frequencies, but along with this improvement came the disadvantage of receiving precipitation clutter. Circularly polarized electromagnetic energy appears to be the most promising technique to reject clutter caused by raindrops. Radars are now in use which are capable of producing, selectively, either linear or circular polarization of electromagnetic energy. Circular polarization technique is based on the assumption that raindrops are symmetrical and objects of desired detection are asymmetrical. In these systems, circularly polarized energy of one direction of rotation is transmitted and the energy reflected by symmetrical raindrops will reverse the direction of rotation and these returns will be rejected by the circularly polarized antenna.

In the invention filed in the United States Patent Office by Begeman et al. on July 14, 1964, Ser. No. 384,029, now Pat. No. 2,453,617, entitled, "Switchable Linear-Circular Polarized Monopulse Radar Feed Producing Two Axis (Three-Dimensional Tracking) Information Utilizing A Two-Lobe Monopulse Design," a two-lobe monopulse antenna feed is used to obtain two-axis elevation and aximuth range tracking information, the same as obtained from a four-lobe antenna feed. The antenna feed consists of a folded-tee or comparator and a circularly polarizing component which may be used to switch from linear polarization to right or left circular polarization, as desired. The circularly polarized waves are produced for transmission by conducting linearly polarized energy of the rectangular waveguide $TE_{10}$ mode from a sum channel of the transmitter through a folded-tee or microwave comparator section to a circular waveguide to convert the energy to the circular waveguide $TE_{11}$ mode. The circular waveguide is rotatable on the folded-tee and has two rods placed diametrically across the guide in the same plane and spaced ⅜ wavelength apart to produce a 90° differential phase shift when the electric fields are parallel to the rods.

The invention field in the United States Patent Office by applicant on Dec. 22, 1965, Ser. No. 515,740, entitled, "3-Channel Selectable Polarization, Target Discrimination Antenna," improved on the previous referenced application of Begeman et al by adding a coupling pin or probe, between the comparator ports and the polarizer, for the purpose of receiving that energy which is cross-polarized with respect to the polarization of the transmitting sum arm. This constituted a great stride in radar art by enhancing the ability to identify different types of targets and to detect hidden targets in rough terrain, forests, underbrush and rough seas. The invention may also be used in a passive system as a radar detector wherein the polarization of received energy may be linear, elliptical, or either rotation of circular.

SUMMARY OF THE INVENTION

The present invention relates to a rotatable antenna feed and receiver horn similar to applicant's co-pending application referenced above, with an improvement being provided in the rotatable section in order to further reduce or minimize clutter and to enhance a target.

Although the rotatable section is similar to the rotatable section of applicant's above-referenced co-pending application, the rotation of the rotatable section of the present invention does not provide circular polarization as would normally be expected, but rather the polarization remains linear but can be rotated to any desired position. The rotatable section is provided with an enlarged diameter susceptor pin having a susceptance of −4 and two additional smaller susceptor pins each having a susceptance of −2 are placed in-line with the enlarged pin with one smaller pin being positioned ⅜ wavelength in front of the enlarged susceptor pin and the other smaller pin being positioned ⅜ wavelength behind the enlarged susceptor pin. After energy enters into the polarizing section, it is rotated by a factor of two, that is, the polarization will be rotated 180° when the rotatable section is turned 90°.

Figure 1:
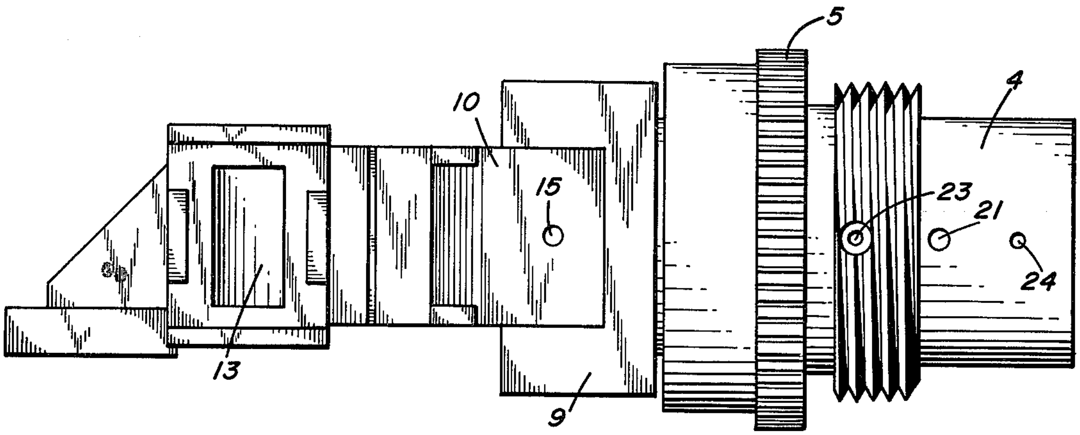
FIG. 1 is a top plan view of a preferred embodiment of the present invention.
Figure 2:
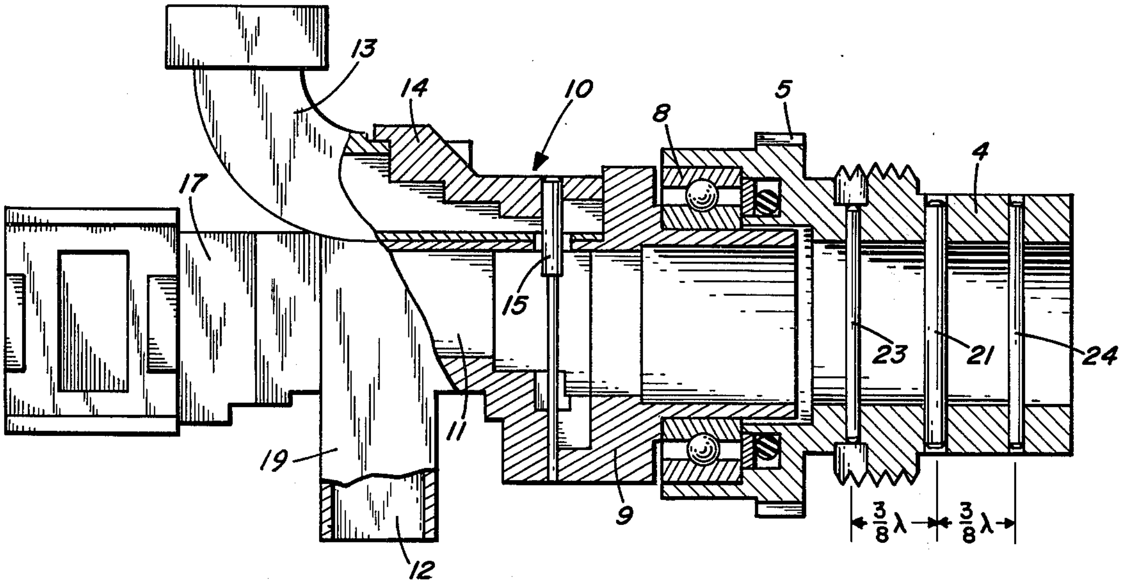
FIG. 2 is a side view, partially broken away, of the embodiment of FIG. 1.

Referring now to the drawing, there is shown a polarizer 4 which has an annular gear 5 which is rotatable as described in applicant's co-pending application, which is referenced above. The polarizer is pressed over a bearing 8 which permits the polarizer to rotate when driven by a gear train. The bearing is pressed on a piece of circular waveguide, designated as the circular extension 9, which is welded to the output walls of a folded-tee comparator 10 in alignment with its output port. The folded-tee comparator 10 has a first sum port 11, a difference port 12, and an output port. A second sum output waveguide 13 is welded to the folded-tee 10 and to its circular extension 9. Welded to the second sum waveguide 13 is a transition piece 14 through which a pin or probe 15 passes to the outer surface of the folded-tee 10. A first sum waveguide 17, second sum waveguide 13, and difference waveguide 19 are supported at the reflector focal point, as shown and more fully described in applicant's above-referenced co-pending application.

An enlarged susceptor pin 21, having a susceptance of −4, is positioned through a diameter of polarizer 4. Two additional susceptor pins 23 and 24 are attached to polarizer 4 and are positioned parallel, and in line, with susceptor pin 21. Pins 23 and 24 each have a susceptance of −2 and are spaced ⅜ wavelengths from susceptor pin 21, with pin 23 being positioned forward of pin 21 and pin 24 being positioned to the rear of pin 21.

OPERATION

In operation, the sum and difference ports, and coupling pin 15, function as described in applicant's above-referenced co-pending application. polarizer 4, however, may be operated in one of two modes. In one mode, which might have an advantage in searching for targets, polarizer 4 might be rotated at a given speed such, for example, as 240 r.p.m. In this mode, linear polarization is provided, but the polarization is continually being rotated to search for man-made targets which are normally more susceptible to a particular angle of polarization than are natural items, such as foliage, or the like. As the polarization is rotated, the resulting radar presentation is continually being changed between an optimum and a minimum condition.

In a second mode of operation, polarizer 4 might be slowly rotated until an optimum radar presentation is presented, and then the rotation of the polarization is stopped and remains at a fixed position. It should be noted, however, that as polarizer 4 is rotated, circular polarization, such as is produced by the device of applicant's above-referenced co-pending application, is not produced, but rather linear polarization is maintained, but the polarization can be rotated to any desired position of 360° in order to enhance target presentation.

I claim:

1. A monopulse radar antenna feed comprising:

a radio frequency energy comparator having a first sum port, a difference port, and a second sum output means including a coupling probe, said comparator being supported on the radar antenna by a first sum waveguide and a difference waveguide coupled in alignment with said first sum port and said difference port, respectively;

a cylindrical housing rotatably mounted to said comparator, and an enlarged susceptor pin and first and second smaller susceptor pins passing through diameters of said cylindrical housing, said susceptor pins being parallel with one another whereby linearly polarized energy radiated from said feed is rotated as said cylindrical housing is rotated.

2. A monopulse radar antenna feed as set forth in claim 1 wherein said enlarged susceptor pin has a susceptance of −4 and said first and second smaller susceptor pins each have a susceptance of −2.

* * * * *